Jan. 16, 1923.

A. ZIMMERMAN.
AUTOMOBILE SIGNAL.
FILED JAN. 26, 1922.

Witness
H. Woodard

Inventor
A. Zimmerman

By H. B. Wilson &co.
Attorneys

Jan. 16, 1923.
A. ZIMMERMAN.
AUTOMOBILE SIGNAL.
FILED JAN. 26, 1922.
1,442,593
4 SHEETS-SHEET 2
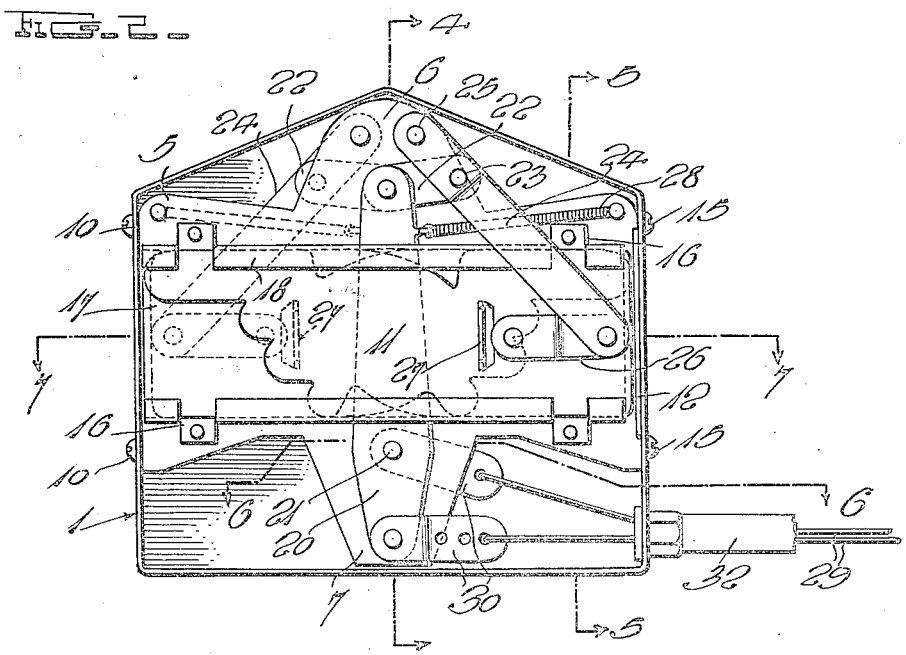
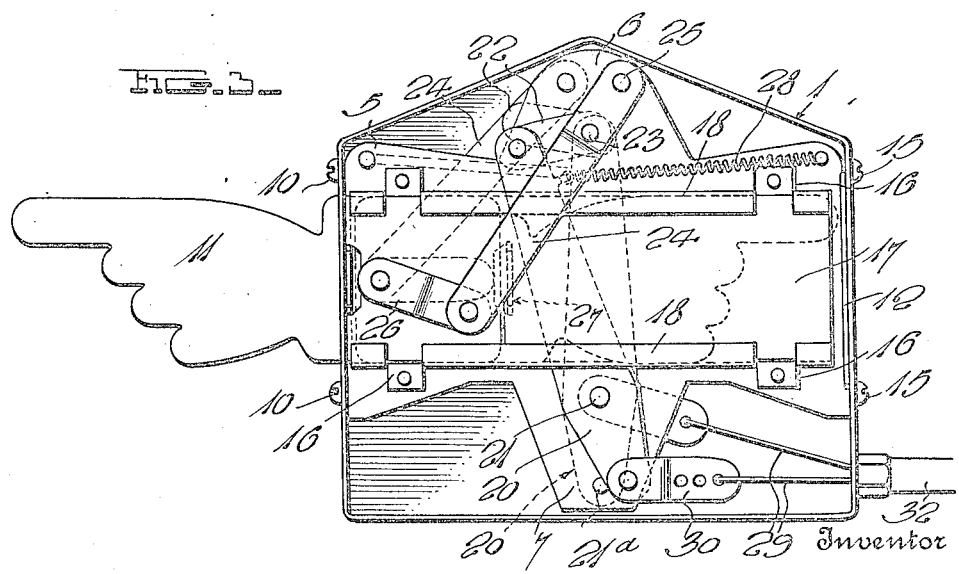
Witness
H. Woodard
Inventor
A. ZIMMERMAN
By H. H. Williamson & Co.
Attorneys

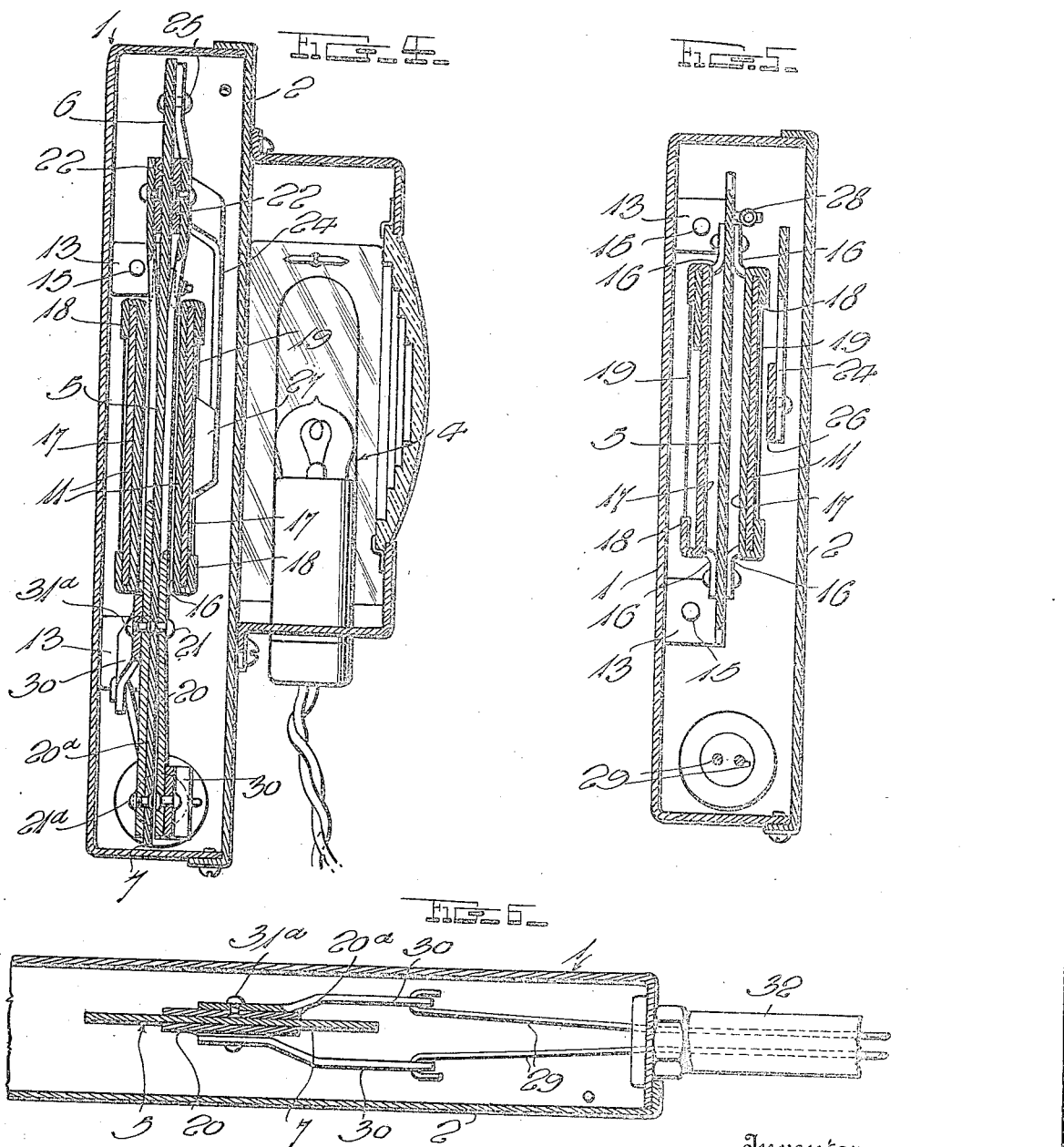

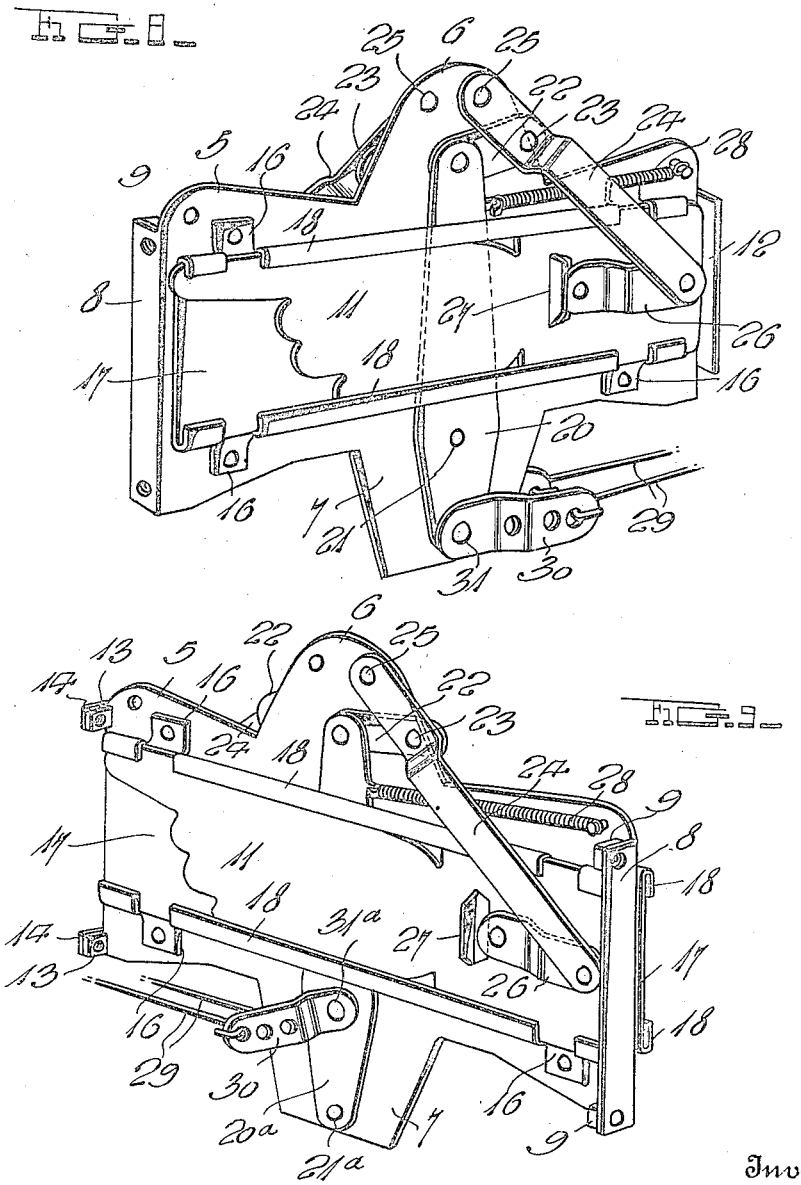

Patented Jan. 16, 1923.

1,442,593

UNITED STATES PATENT OFFICE.

ALOIS ZIMMERMANN, OF YAKIMA, WASHINGTON; HENRY C. KOHLS GUARDIAN OF THE PERSON AND ESTATE OF SAID ALOIS ZIMMERMANN, INCOMPETENT.

AUTOMOBILE SIGNAL.

Application filed January 26, 1922. Serial No. 531,983.

*To all whom it may concern:*

Be it known that I, ALOIS ZIMMERMANN, a citizen of Germany, and a resident of the United States, residing at Yakima, in the county of Yakima and State of Washington, have invented certain new and useful Improvements in Automobile Signals; and I do declare the following to be a full, clear, and exact description of the invention, such as will enable others skilled in the art to which it appertains to make and use the same.

My invention relates to improvements in devices carried by automobiles and adapted to indicate when the machine is to turn in one direction or the other or when it is to be stopped. I am aware that numerous devices for this purpose have heretofore been devised, but it is the object of my invention to provide a simple, compact and inexpensive, yet a highly efficient and desirable signal which may be easily operated.

With the foregoing in view, the invention resides in the novel subject matter hereinafter described and claimed, the descriptive matter being supplemented by the accompanying drawings:

Figure 2 is an elevation of the internal parts of the device showing the indicators withdrawn into the casing.

Figure 3 is a duplicate of Fig. 2 with the exception that it illustrates one of the indicating hands in projected position.

Figure 4 is a vertical transverse sectional view as indicated by line 4—4 of Fig. 2.

Figure 5 is a similar view as indicated by line 5—5 of Fig. 2.

Figure 1:
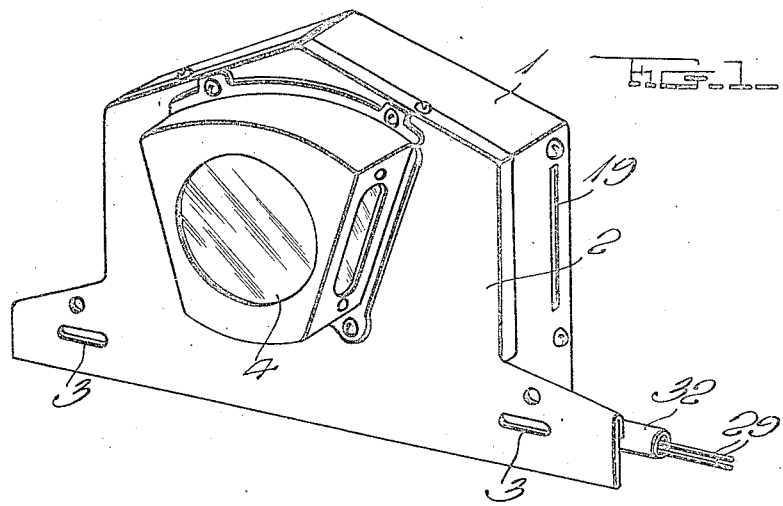
Figure 1 is a perspective view of a signalling device constructed in accordance with my invention.
Figure 7:
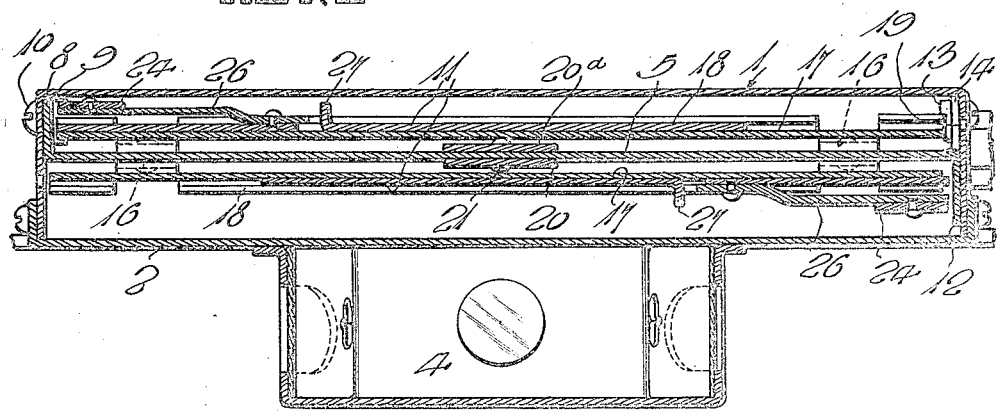

Figures 6 and 7 are horizontal sectional views on the lines 6—6 and 7—7 respectively of Fig. 2.

Figures 8 and 9 are perspective views of the partition plate which is mounted in the casing and carries the movable parts of the device.

Figure 10:
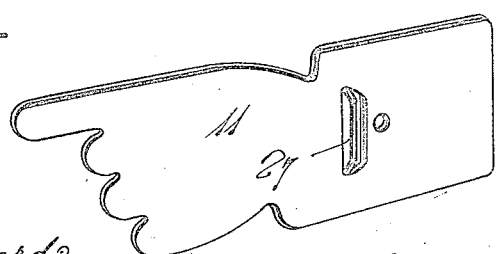

Figure 10 is a perspective view of one of the indicating hands.

In the drawings above briefly described, the numeral 1 designates a comparatively flat casing provided with a detachable back plate 2 which is formed with any suitable means 3 for attaching a license tag thereto, said back plate being also provided with an appropriate tail light 4. Within the casing 1, is a vertical partition plate 5 whose upper and lower edges are preferably provided with vertically disposed extensions 6 and 7 respectively. One end of the plate 5 is bent laterally to provide a flange 8 which contacts with one end of the casing 1, said flange being here shown as provided with nuts 9 into which screws 10 are threaded to anchor one end of the partition plate in the casing. The intermediate portion of the flange 8 also forms a stop to limit the retracting movement of one of the indicating hands 11, one of these hands being located at one side of the partition plate, while the other is disposed at the opposite side. To limit the retracting movement of the last named hand, a lateral flange 12 is bent from the end of the plate 5 remote from the flange 8 and to anchor this end of the plate, nuts 13 are secured to lateral ears 14 on said plate to receive suitable screws 15.

Spaced outwardly from each side of the partition plate 5, by means of feet 16, secured thereto in any suitable manner, is a horizontally elongated guide plate 17 whose upper and lower edges are bent inwardly towards its outer side to provide guide flanges 18. The flanges 18 of the two plates 17 slidably receive the stamped metal indicating hands 11 as shown clearly in the drawings. The inner ends of these hands strike the flanges 8 and 12 when said hands are retracted. When their use is necessary, the hands may be either individually or simultaneously projected (see Fig. 3) through appropriate slots 19 in the ends of the casing 1.

For operating the indicating hands 11, I preferably use the construction shown. Between one of the guide plates 17 and the partition 5, I position a flat vertically disposed lever 20 which is fulcrumed between its ends to the partition as indicated at 21, while between the other guide plate 17 and the partition 5, I mount a second operating lever 20ª which is fulcrumed to the extension 7 as indicated at 21ª, the fulcrum being located at the lower extremity of the lever. Links 22 are pivoted respectively to the upper ends of the levers 20 and 20ª and extend oppositely therefrom, the outer ends of said links being pivoted at 23 to other levers 24 disposed at opposite sides of the partition and fulcrumed to the extension 6 as shown at 25, the fulcrums being located at the upper ends of these levers 24. The lower ends of the levers 24 are connected by links 26 with the indicating hands 11 so that when the levers 20 and 20ª are operated in the proper manner, said hands will be projected from the casing through the slots 19, the extent of projection being limited by stops 27 which are preferably stamped outwardly from the inner end portions of the hands. To return the hands into the casing 1 when the projecting means is released, I provide suitable springs 28 which are here shown in the form of coiled springs attached at one end to the partition plate 5, while their other ends are connected with the upper ends of the levers 20 and 20ª.

For operating the levers 20 and 20ª to project the hands 11, I provide a pair of wires or cables 29 which are linked at 30 to said levers, the connection 31 of one of the links 30 with the lever 20 being below the fulcrum 21 of the latter, while the point 31ª at which the other link 30 is connected with the lever 20ª is above its fulcrum 21ª. This relation of parts and location of the fulcrums 21 and 21ª in the manner disclosed, is necessary in order that the operating mechanism for the hands 11 may act to project said hands from opposite ends of the casing 1. The wires or the like 29 are adapted to lead to foot pedals or any other suitable controls within easy reach of the driver, and I have shown a tube 32 for guiding them.

The device is adapted to be mounted on the rear end of an automobile, either pleasure or commercial, and carries the tail light and license tag, the former being so arranged as to illuminate the latter in the required manner as well as to shed its rays upon the indicating hands 11 when they are projected. By projecting the left hand, the drivers of other vehicles as well as pedestrians are notified that a left-hand turn will be made; the right hand is projected when a turn is to be made in the other direction, and when the machine is to be stopped, both hands are extended.

Excellent results have been obtained from the details disclosed and hence they may well be followed in the manufacture of the invention. I wish it understood, however, that within the scope of the invention as claimed, numerous minor changes may be made.

I claim:

1. An automobile signalling device comprising a casing having a vertical partition therein, horizontal guides carried by opposite sides of said partition, oppositely movable indicators at opposite sides of said partition slidable in said guides, vertical levers fulcrumed to opposite sides of said partition, means operatively connecting the upper ends of said levers with said sliding indicators, means for normally drawing said indicators into the casing, and a pair of operating members extending from the casing, one of said operating members being connected with one of said levers above its fulcrum while the other operating member is attached to the other lever below its fulcrum.

2. A structure as specified in claim 1, the connecting means between the upper ends of said levers and said sliding indicators comprising inclined levers fulcrumed at their upper ends to opposite sides of said partition and linked at their lower ends to said indicators, and links connecting said inclined levers to the upper ends of said first named levers.

3. An automobile signalling device comprising a casing, a horizontal guide mounted within said casing, a horizontally movable indicating slide mounted in said guide, a vertical lever in said casing fulcrumed below said guide and extending upwardly across the latter, an inclined lever fulcrumed at its upper end in the casing above said guide and linked at its lower end to said slide, and connecting means between the upper end of said said first named lever and said inclined lever, together with means for swinging said first named lever and means for returning said slide into the casing after it is projected.

4. An automobile signalling device comprising a casing, a horizontally elongated guide plate secured to one vertical wall of said casing but spaced slightly from the latter, a sliding indicator supported by said guide plate, a vertical operating lever between said guide plate and said vertical wall and fulcrumed to the latter, connecting means between said lever and said indicator, means for normally moving said indicator into the casing, and means for swinging said lever to project said indicator.

5. An automobile signal comprising a casing having vertical ends, a vertical partition mounted in said casing and having oppositely extending lateral flanges at its opposite ends secured to said casing ends respectively, the latter being each provided with a slot adjacent the partition, guides mounted on opposite sides of said partition, horizontally slidable indicators supported by said guides and limited in their inward movement by said flanges, spring means for normally returning said indicators against said flanges, and means for projecting the indicators through said slots.

In testimony whereof I have hereunto set my hand.

ALOIS ZIMMERMANN.